Figure 1:
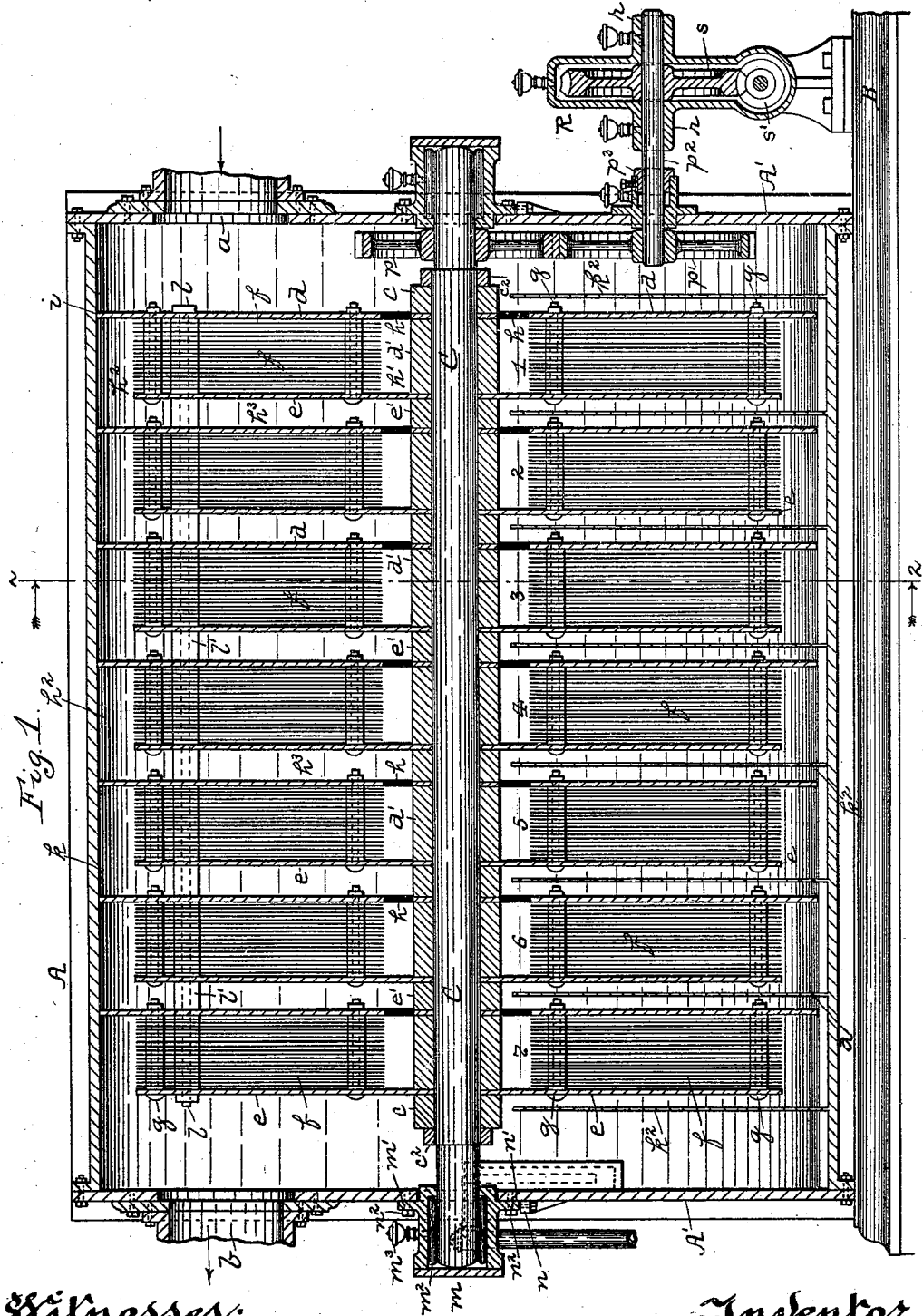

(No Model.) 4 Sheets—Sheet 1.

F. L. SLOCUM.
GAS WASHER AND SCRUBBER.

No. 551,694. Patented Dec. 17, 1895.

Witnesses:
Wm. J. Martin.
Luella H. Knox.

Inventor.
Frank L. Slocum.
By Kay, Totten & Cooke,
Attorneys.

(No Model.) 4 Sheets—Sheet 2.

F. L. SLOCUM.
GAS WASHER AND SCRUBBER.

No. 551,694. Patented Dec. 17, 1895.

Witnesses:
Wm J. Martin,
Luella H. Knox.

Inventor:
Frank L. Slocum.
By Kay, Totten & Cooke,
Attorneys.

(No Model.) 4 Sheets—Sheet 4.

F. L. SLOCUM.
GAS WASHER AND SCRUBBER.

No. 551,694. Patented Dec. 17, 1895.

Witnesses:
Hen. J. Hartin.
Luella H. Knox.

Inventor:
Frank L. Slocum.
By Kay, Totten & Cooke
Attorneys

UNITED STATES PATENT OFFICE.

FRANK L. SLOCUM, OF PITTSBURG, PENNSYLVANIA, ASSIGNOR OF ONE-HALF TO JAMES GARDNER, JR., OF SAME PLACE.

GAS WASHER AND SCRUBBER.

SPECIFICATION forming part of Letters Patent No. 551,694, dated December 17, 1895.

Application filed June 6, 1893. Serial No. 476,765. (No model.)

*To all whom it may concern:*

Be it known that I, FRANK L. SLOCUM, a resident of Pittsburg, in the county of Allegheny and State of Pennsylvania, have invented a new and useful Improvement in Gas Washers and Scrubbers; and I do hereby declare the following to be a full, clear, and exact description thereof.

My invention relates to apparatus for scrubbing gases, and, as it might be termed, to apparatus for "washing," "purifying," and "condensing" gases or vapors, the invention relating to certain improvements in the gas-scrubber having a series of perforated plates or disks which revolve in absorbent liquid and through the upper part of which the gas passes in a substantially horizontal course, and also to certain improvements in the general class of scrubbers set forth in Letters Patent to Kirkham, *et al.*, No. 206,736, dated August 6, 1878.

In the first class of rotary gas-scrubbers two difficulties have been encountered, one the proper sealing or closing of the space between the rotary portions of the scrubber and the inclosing case and where the gas passes through the same, so as to prevent a current of gases passing around the plates without coming in contact with the absorbent liquid, it being found that the gases will naturally seek such an outlet. Another difficulty in the class of scrubbers shown in said Patent No. 206,736 is in the friction between the surfaces necessarily bearing on each other to prevent the passage of the gases between such surfaces, such as the friction of the rings against the faces of the partitions which divide the scrubber into the different compartments through which the gas is caused to flow outwardly or radially between the series of plates. It was necessary to hold these plates together, and it was also necessary to make a substantially tight joint between the partitions and the bosses or rings confining the lower edges of the cluster of plates. This requirement led to the creation of such an amount of friction that considerable power was required to rotate or operate the scrubber, and in the end the sets of disks were often loosened from the central shaft and instead of rotating on said shaft would simply rest thereon and would quickly cut the shaft out and render the scrubber inoperative.

One of the objects of the present invention is to improve this class of rotary scrubbers so as to overcome this difficulty.

Another object of the present invention is to improve the method of applying the power so as to prevent leakage of the gas, as there are no moving parts having journals through which the gases could escape.

The particular points of the invention desired to be covered will be hereinafter set forth and claimed.

To enable others skilled in the art to make and use my invention I will describe the same more fully, referring to the accompanying drawings, in which—

Figure 2:
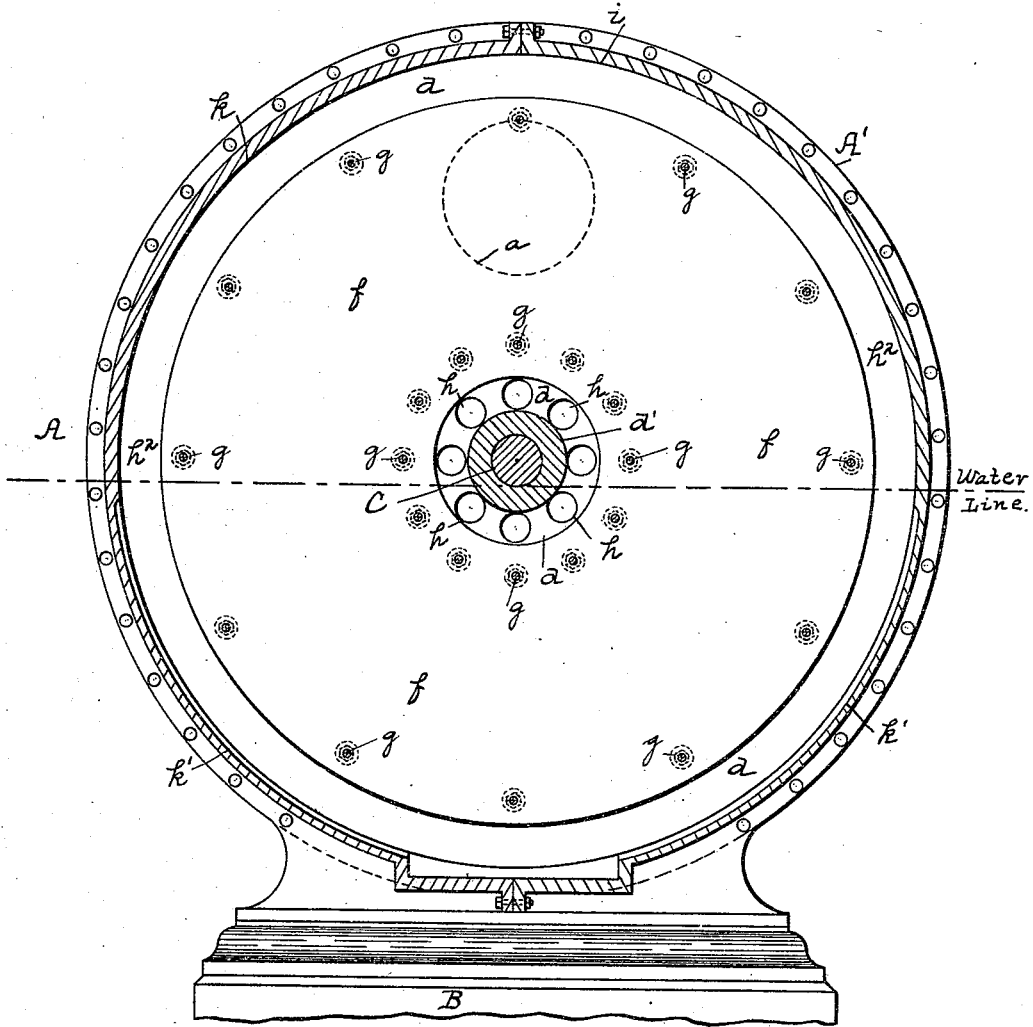
Figure 3:
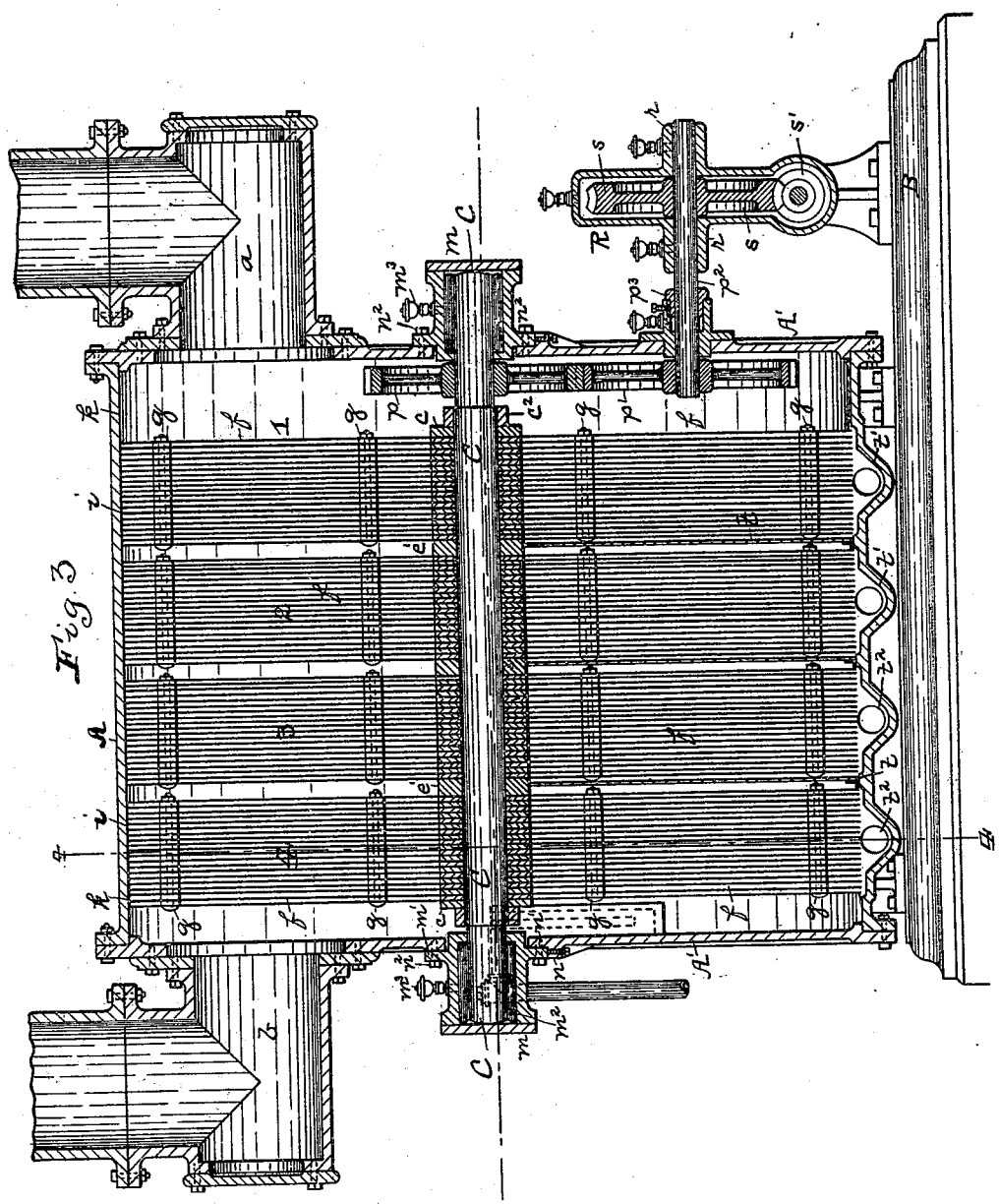
Figure 4:
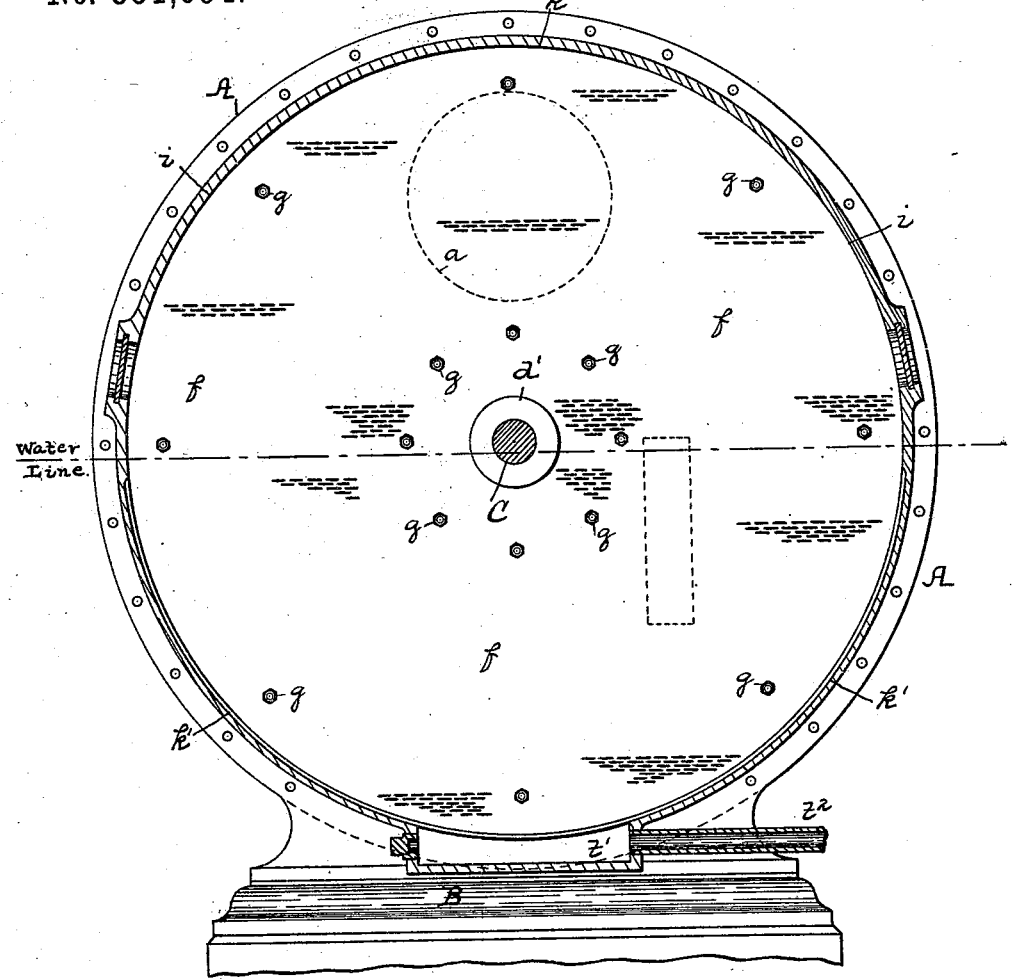

Figure 1 is a longitudinal central section of a gas-scrubber of the general class referred to in said patent, and Fig. 2 is a sectional view on the line 2 2, Fig. 1. Fig. 3 is a longitudinal section of a gas-scrubber formed of a series of perforated plates or disks; and Fig. 4 is a sectional view on the line 4 4, Fig. 3, the perforations through the disk being indicated at different points, and it being understood that the disk is perforated throughout.

Like letters and figures of reference indicate like parts in each view.

I will first describe the invention in connection with the class of scrubbers referred to in said patent, in which the gases are required to pass to the central portion of the scrubber around the central shaft or hub and thence in a zigzag course outwardly or radially through a series of plates and back to the central portion, this course being followed throughout the scrubber, and the gas being purified by being brought into contact with the liquids held between the plates which are immersed in the lower part of the scrubber in the absorbent liquid and carry the same up so that the gases in passing between the plates are necessarily brought in contact therewith and the ammonia or other materials to be absorbed are taken up by the liquids while the gases are condensed and cooled by contact with the same.

The object of the present invention, so far as it relates to the construction above indicated, is to provide a gas-scrubber of that construction in which the necessity of the partitions between each cluster of plates is overcome, and in which there are no such frictional faces between such partitions and the bosses confining the lower ends of the plates, and therefore in which such frictional action is entirely done away with. To these ends I employ a case A having a gas-inlet $a$ and a gas-outlet $b$, and I mount in the same the central shaft C, the method of mounting the same being hereinafter described. Upon that shaft I secure at intervals the end plates of each series or cluster of plates, mounting each set or series directly upon the shaft, and clamping the whole together as illustrated in Fig. 1—that is to say, taking, for example, the first cluster of plates, near the entrance $a$, upon the shaft is a collar $c$, which can either form part thereof or be secured thereupon, and one of the supporting-plates $d$ is placed against that collar, said plate $d$ resting directly upon the shaft C and against the collar $d'$ and being confined by another collar $e'$.

Suitable engaging devices between the shaft and the supporting plates and collars and between the supporting plates and collars themselves, so as to secure them rigidly together, may be employed, so that the whole body is held rigidly to place. Between the said supporting-plates $e$ and $d$ are secured the series of disks $f$, which are clamped between the supporting-plates $e$ $d$ by the bolts $g$, which are arranged at suitable intervals, and so secure the disks between the supporting-plates. These disks may be made of sheet or plate metal, of suitable thickness, and are held apart a distance of about one-eighth of an inch by means of the slight projections formed in the plates by blows at intervals thereon, forming indentations on one side and slight projections on the other.

It will be seen that the plates $d$ have the openings $h$ formed therein just above the collars $c$ $d'$, and that the disks $f$ do not extend down to the collars, the space or chamber $h'$ being left between the two.

It will also be seen that the outer edge $i$ of the supporting-plate $d$ fits closely to the inner face $k$ of the casing that is in the upper part thereof, so that the gas cannot escape around the upper end of the plate $d$ and therefore will flow down to the openings $h$ into the chamber $h'$ and will then rise between the disks $f$ to the outer end thereof, entering the chamber $h^2$. The plates are arranged in clusters around the shaft, spaces being left between the plate $e$ and the plate $d$ of the next cluster, so as to form a downtake passage or chamber $h^3$, through which the gases will flow downwardly to the opening $h$ leading into the space $h'$ at the base of the next cluster. The chamber $h^3$ may be filled with a series of disks, if desired, but that is not considered the preferable construction. The plate $e$ is formed imperforate at the lower end, so as to form the confining-wall for the chamber $h'$, but it does not extend out to the face $k$ of the outer wall or casing, so that the gases can flow around the outer end of said plate $e$ and thence inwardly through the chamber $h^3$ into the chamber $h'$ of the next cluster 2. The course of the gases is thus arranged through each cluster entering the chamber $h'$ through the openings $h$ in the plates $d$ and passing outwardly between the disks $f$ into the chamber $h^2$ and thence inwardly through the chamber $h^3$ to the next cluster of plates or disks. In order to mount these clusters upon the shaft, I employ the same construction above referred to, each supporting-plate $d$ $e$ resting upon the central shaft and being clamped between the collars $d'$ $e'$, the collars $d'$ corresponding in width to the cluster of disks $f$, while the collars $e'$ correspond in width to the spaces $h^3$, the whole being clamped firmly upon the shaft C and held in place by the outer collars $c$ and by suitable nuts $c^2$. I also find it desirable, though not necessary, to carry one or more bolts throughout the entire cluster of plates, as shown by $l$, a long bolt passing through each cluster and having sleeves or collars $l'$ fitting around the same in the spaces $h^3$. In this way the entire mass of plates is properly clamped together, not only at the center, but at the outer ends thereof. I am thus enabled to provide a rigid mass of plates securely clamped together and having no frictional contact with any surface, and yet obtain the same results as found in the ordinary washers, such as shown in the patent above referred to.

It will be seen, of course, that for the purposes of practicing the invention in the way above described it is necessary to provide a practically gas-tight joint between the series of plates $d$ and the upper part of the washer through which the gas passes, and this applies as well to the class of washers formed of a series of perforated plates or disks as in connection with the washer just above described. For this purpose I provide an accurately-turned closed joint between the outer edges of the plates and the body of the casing, so that the plates may be brought in such close proximity with the walls of the casing that a water-film joint may always be maintained between the plates and casing. This is accomplished in the following way: As shown in Figs. 2 and 4 the upper part of the casing A (which casing can be divided into any number of sections desired) is turned accurately from a point at the line of the central shaft C throughout the entire upper portion thereof, this being done by suitable machinery so as to bring the same accurately to the desired size and curve for the face $k$ thereof. The lower part of the casing A, which is filled with the absorbent liquid, is not turned to such face but leaves space for the flow of the liquid around the ends of the plates, a depression $k'$ being formed around that portion of the case and the lower part of the casing being divided into a series of compartments by the partitions $k^2$. The outer edges of the plates which are to form the joints with the casing are also accurately turned to the proper size after they are mounted upon the central shaft so as to bring them to the exact size required—that is, to such size as will enable the plates to fit so close to the face $k$ that a film of water or other absorbent liquid will always be maintained between the edge $i$ of the plates and the inner face $k$ of the casing. Practice shows that this joint, while not that of actual contact and friction, can be made so close that the water carried up by the edges of the plates will always maintain a film or water-joint between the plates and the face $k$ of the casing, so that the gases cannot pass around the same. It is evident, however, that in the erection of the machine it will be practically impossible to bring the parts into that exact position, and to enable this to be accomplished, instead of making the bearings $m$ for the shaft C rigid with the casing, I form the same adjustable therein, so that after the closing of the casing the shaft can be raised and bring the edges of the plates into the exact position proper for maintaining the joint between the edges $i$ thereof and the face $k$. This is shown in the drawings, Figs. 1 and 3, in which the bearing-block $m$ is secured to the end wall A' of the casing by the flanges $m'$ through which bolts pass, the casing having the shoulder $n$ below the seat $n'$ on the flange $m'$ of the bearing, and through said shoulder $n$ the set-screw $n^2$ extending so as to bear against the flange of the bearing $m$ and provide for the accurate adjustment of the same.

Suitable metal or packed joints may be employed between the casing and flange $m'$ of the bearing so as to prevent leakage of the gas. The bearings $m$ are also made closed and gas-tight so that there can be no leakage through the bearings, this being preferred, and the power being applied to rotate the shaft C in another way so as to overcome the necessity of stuffing-boxes and the necessity of such tight packing for the shaft as would create friction in the rotation of the same.

The bearings $m$ may contain suitable brasses or bearing-blocks $m^2$ and the oil may be fed thereto through the oiling-cup $m^3$.

After the casing has been closed around the shaft and when the machine is ready to be put in operation, the shaft is accurately adjusted within the casing by the loosening of the bolts connecting the bearings to the casing and the adjustment of such bearings through the set-screws $n^2$ so as to form such exceedingly close joint between the plates and the inner face $k$ of the casing, the shaft being raised and adjusted to give this result.

It is evident that another source of leakage of the gas from these rotary scrubbers is found in the driving of the main shaft thereof through the stuffing-boxes just above alluded to, and also that it is easier to maintain a water-tight joint than a gas-tight joint, and for that purpose I have arranged to drive the central shaft C in the following way: Upon the same I place the gear-wheel $p$ which meshes with the gear-wheel $p'$ upon the shaft $p^2$, which shaft extends through the stuffing-box $p^3$ in one of the end plates A' and below the water-line of the scrubber. The shaft $p^2$ is mounted in suitable bearings $r$ formed in the frame R which is secured to the foundation B of the machine and within which frame R is the worm-wheel $s$ which is secured to the shaft $p^2$, said worm-wheel being driven by the worm $s'$ mounted in the frame B, while to the shaft carrying said worm power can be applied by any suitable means, either directly by the engine, or by connections from any other suitable source of power. In this way even in a large scrubber it is found that the same can be driven at the expenditure of practically no power, the different plates clamped upon the main shaft being arranged to practically balance each other, and said shaft being mounted in the bearings generating little or no friction and the power being applied to the same through a joint which does not require to be more than usually tight, while the outer edges of the plates form close joints with the inner face of the casing but do not actually contact therewith, and there is practically no friction in the rotation of the series of plates. The water or other liquid can be fed to the casing in any suitable way by suitable goose-neck or other like pipes and carried away from the same in the same way.

In the scrubber formed of a series of perforated plates or disks I generally prefer to separate the lower part of the casing into a series of chambers by the vertical partition-plates $t$, and at the bases of the chambers so formed are pockets $t'$ to receive any tar or like condensable matters which can be conducted from the same through the pipes $t^2$.

In the operation of scrubbers of the construction shown in Figs. 1 and 2 gas enters through the port $a$ and flowing down enters through the openings $h$ into the chamber $h'$ and rises between the plates or disks $f$ into the chamber $h^2$. The plates are rotating within the liquid contained in the bottom part of the casing and as they rotate their surfaces are coated with the water or other absorbent liquid and it is evident that the gases passing up between these plates are brought into contact with the same which is flowing downwardly over the plates as soon as they rise from the body of the liquid, and it is therefore evident that the gases must be brought into contact with the absorbent liquid and that the liquid will act to absorb from the same the ammonia, benzole, or other vapor desired to be recovered. This operation will continue between each set or cluster of plates, and by the time the gases reach the other end of the apparatus and flow through the discharge-pipe $b$ practically all of the ammonia or other materials desired to be recovered will be absorbed therefrom, and at the same time any other condensable matters, such as tar, found in the illuminating-gas, will be deposited by the gases and collect in the bottom part of the apparatus. The seal or joint between the plates $d$ and the inner face $k$ of the casing will be maintained in the manner above described by the film of water on account of the close meeting of the edges $i$ of said plates with said casing, yet as there is not an actual contact there will be no friction between such parts.

In the operation of the apparatus shown in Figs. 3 and 4 the several plates are placed close to each other, and are perforated with numerous small holes, such as shown in Fig. 4, these holes being made in one plate opposite the solid portions of the adjoining plate and these openings being made in the one plate opposite the blank spaces in the adjoining plate, and as the plates pass down into the liquid the liquid is taken up thereby and held in these small openings or perforations so that as the gas strikes against the same it will be brought in contact with the liquid and will be compelled to force the liquid out of the perforations in the many cases, and the gases will in this way be compelled to pass through each plate and strike against the adjoining plate in their course from the entrance to the delivery end of the apparatus, while the liquid so forced out of the perforations will be sprayed in such way as to descend between the plates and act as a waterspray to further absorb the desired vapors from the gases. The joints $i$ of all the different plates against the face $k$ of the casing in the gas-space thereof will be maintained in the manner above described.

What I claim as my invention, and desire to secure by Letters Patent, is—

1. In gas washing or scrubbing apparatus, the combination of an inclosing case having inlet and outlet ports, a horizontal rotary shaft mounted therein, and a series of plates secured to that shaft within the casing and held sufficiently close to the inner face of the casing to form a film joint between the said plates and the inner face of the casing, substantially as set forth.

2. In gas washing or scrubbing apparatus, the combination of an inclosing case having inlet and outlet ports, a horizontal rotary shaft mounted therein, a series of plates secured to said shaft within the casing and held sufficiently close to the inner face of the casing to form a film joint between the said plates and the inner face of the casing, and bearings for said horizontal shaft made separate from the casing and adjustable thereon, substantially as set forth.

3. In gas washing and scrubbing apparatus, the combination of an inclosing case, a horizontal shaft mounted therein and carrying a series of plates or disks, said plates or disks being supported sufficiently close to the inner face of the case to form a film joint therewith, bearings formed separate from and secured to the end plates, said bearings having flanges and the end plates having seats for said flanges and shoulders below the flanges through which set screws extend to engage with the flanges, substantially as and for the purposes set forth.

4. In gas washing or scrubbing apparatus, the combination of a case having inlet and outlet ports, a central shaft, supporting plates rigidly secured thereto and supporting a cluster of annular disks, one of said supporting plates fitting closely to the inner face of the outer casing and having openings close to the central shaft, and the other of said plates extending up to the upper ends of the cluster of disks confined between the two supporting plates, substantially as and for the purposes set forth.

5. In gas washing or scrubbing apparatus, the combination of a case having inlet and outlet ports, a central shaft, a series of clusters each formed of two supporting plates rigidly secured to the shaft and supporting a series of annular plates or disks, one of said supporting plates fitting closely to the inner face of the outer casing and having openings close to the central shaft, and the other of said plates extending up to the upper ends of the cluster of disks confined between the two supporting plates, said clusters being separated from each other so as to leave spaces for the passage of the gas, substantially as and for the purposes set forth.

6. In gas washing or scrubbing apparatus, the combination of the casing having inlet and outlet ports, the central shaft mounted therein, the supporting plates $e\ d$ rigidly secured to the said shaft and supporting a cluster of annular disks confined between the same, the plate $d$ having the openings $h$ and the cluster of disks being supported some distance above such openings so as to form the central chamber $h'$ and said disks extending toward but not contacting with the outer casing so as to form the chamber $h^2$, substantially as and for the purposes set forth.

I testimony whereof I, the said FRANK L. SLOCUM, have hereunto set my hand.

FRANK L. SLOCUM.

Witnesses:
JAMES I. KAY,
J. N. COOKE.